United States Patent [19]

Dale

[11] 4,403,104
[45] Sep. 6, 1983

[54] GAS-INSULATED BUSHING HAVING MINIMIZED THROAT DIAMETER

[75] Inventor: Steinar J. Dale, Monroeville, Pa.

[73] Assignee: Westinghouse Electric Corp., Pittsburgh, Pa.

[21] Appl. No.: 368,557

[22] Filed: Apr. 15, 1982

[51] Int. Cl.³ ............................................ H01B 17/26
[52] U.S. Cl. .................................... 174/31 R; 174/19; 174/142
[58] Field of Search ........ 174/14 BH, 15 BH, 16 BH, 174/18, 19, 31 R, 142, 143, 152 R, 153 R

[56] References Cited

U.S. PATENT DOCUMENTS

| 2,160,660 | 5/1939 | Hobart | 174/31 R X |
| 3,934,071 | 1/1976 | Tahiliani | 174/31 R |
| 4,166,194 | 8/1979 | Bolin | 174/31 R |
| 4,202,998 | 5/1980 | Cronin | 174/31 R |

FOREIGN PATENT DOCUMENTS 52-8495  1/1977  Japan .................................. 174/142

Primary Examiner—Laramie E. Askin
Attorney, Agent, or Firm—M. S. Yatsko

[57] ABSTRACT

A low-pressure gas-insulated bushing is provided including an elongated, hollow insulating shell having a terminal end and a throat end with a opening therethrough. A bushing terminal is secured to the shell terminal end, and an insulating gas at low pressure is disposed in the shell. A tubular electric conductor is disposed in the shell and extends outwardly therefrom through the throat end opening. The conductor is in electrical contact with the terminal end, thereby providing electrical connection to an overhead line. The conductor is expanded in diameter in the vicinity of the throat end to minimize the throat diameter required, while the conductor at the remainder of its length is sized to carry the rated current of the bushing.

7 Claims, 3 Drawing Figures

GAS-INSULATED BUSHING HAVING MINIMIZED THROAT DIAMETER

BACKGROUND OF THE INVENTION

This invention relates generally to gas-insulated equipment, and more particularly to a gas-filled bushing using an increased diameter conductor portion at the end of the bushing to minimize the throat diameter thereof.

Gas-insulated equipment is being used on ever-increasing scale in recent years due to the desirability of increasing safety, problems in acquiring the necessary acreage for substations and right-of-way for overhead lines, higher power requirements of growing metropolitan areas, and the overall growing demands for electrical energy. Typical of such installations are gas-insulated, high voltage substations dealing with voltages of magnitudes in the kilovolt ranges and higher, with main components such as circuit breakers, switches, capacitor banks, and the like, enclosed in gas-filled grounded metal containers which are interconnected by elongated conductors which are also contained in outer grounded sheaths filled with the insulating gas. Typical of the gas utilized in these substations is sulfur hexafluoride, whose high dielectric strength minimizes the separation distances required between adjacent electrical components, to thereby decrease the size of the equipment.

Generally, whenever utilizing gas-insulated equipment, it is necessary to provide an air entrance bushing to make the connection from an overhead line, for example, to the gas-insulated equipment. Presently, these bushings generally consist of an elongated porcelain or epoxy body of tapering or straight diameter with suitable corona rings at the ends of the body to allow adequate flaring of dielectric potential lines.

For certain applications, as for example a compact, gas-insulated capacitor bank, the sulfur hexafluoride gas is utilized at a low pressure, for example 10 pounds per square inch gauge. At these low pressures, the throat diameter of a gas-insulating bushing can become very large for the most economical choice of conductor. That is, if the conductor diameter is sized to carry a given rated current and is dimensioned accordingly, with a small diameter conductor, the throat diameter of the insulating shell of the bushing can correspondingly be very large. The increase in size of this throat diameter of the shell is directly translatable into a higher cost to produce the shell. It therefore is desirable to achieve some means of decreasing the size of the throat diameter of the insulating shell, thereby reducing the manufacturing cost for the shell, without incurring the penalty associated with increasing the conductor size.

SUMMARY OF THE INVENTION

In accordance with this invention, a low pressure gas-insulated bushing is provided including an elongated, hollow insulating shell having a terminal end and a throat end with an opening therethrough. A bushing terminal is secured to the shell terminal end, and an insulating gas at low pressure is disposed in the shell. A tubular electric conductor is disposed in the shell and extends outwardly therefrom through the throat end opening. The conductor is in electrical contact with the bushing terminal, thereby providing electrical connection to, for example, an overhead line. The conductor is expanded in diameter in the vicinity of the throat end to minimize the throat diameter required, while the conductor along the remainder of its length is sized to carry the rated current of the bushing.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
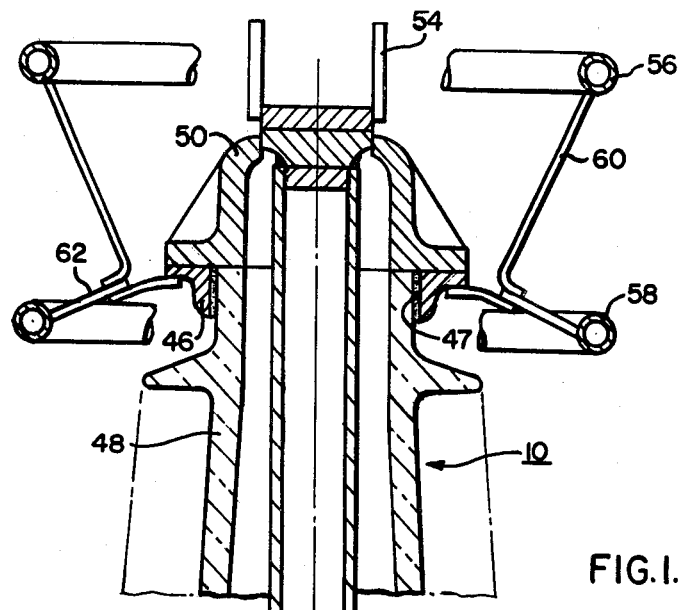
FIG. 1 is a cross-sectional view of a gas-filled bushing utilizing the teachings of this invention.
Figure 1:
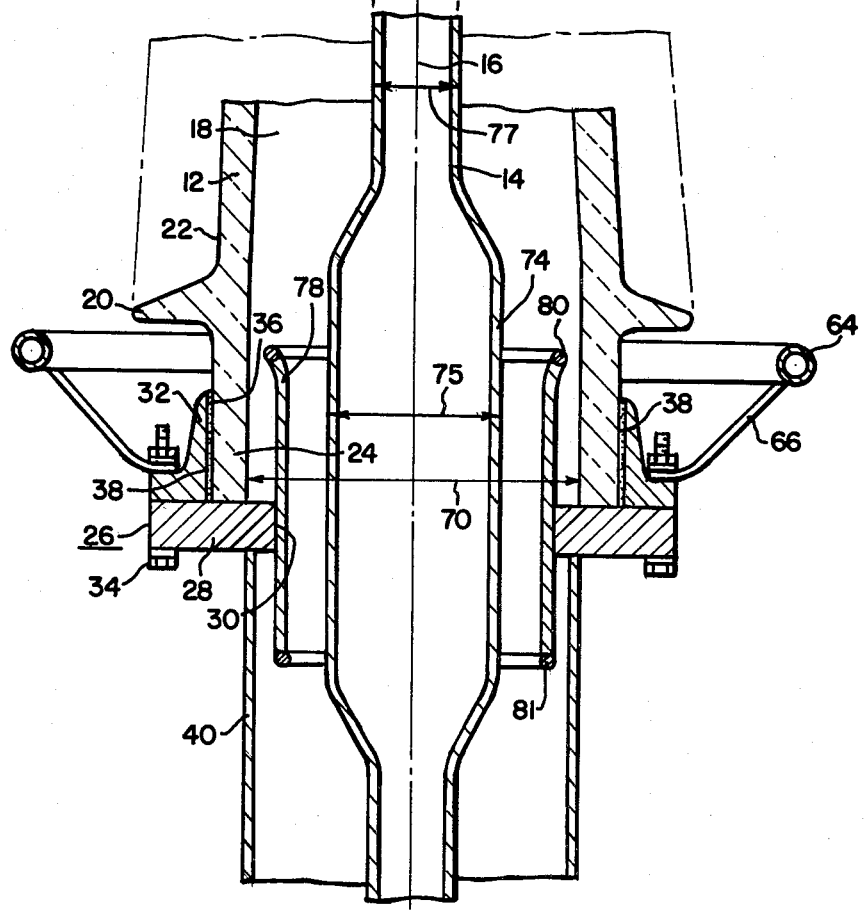

In accordance with this invention, the gas-filled bushing 10 illustrated in FIG. 1 comprises a hollow, elongated insulating shell 12, a central electrical bushing conductor 14 extending along the axis 16 of the insulating shell 12, and an insulating gas 18 disposed within the insulating shell 12 and which typically may be sulfur hexafluoride at a low pressure such as 10 pounds per square inch gauge. The insulating shell 12, which may be of procelain or epoxy, has a plurality of skirts 20 along the outer surface 22 thereof, and is typically of a conically-tapering cross section.

The shell 12 is secured, at a throat end portion 24, to a mounting ring 26. The mounting ring 26 is comprised of a generally planar, cylindrical base member 28 having a central opening 30 therethrough, and a longitudinal extension 32 which is secured to the base member 28 by means such as the bolts 34. The longitudinal extension 32 is disposed adjacent the outer surface 36 of the throat end 24 of the insulating shell 12. A cement 38 is disposed between the longitudinal extension 32 and the throat end 24, with the cement 38 securing the throat end 24 and thereby the insulating shell 12 to the longitudinal extension 32. The base member 28 and the longitudinal extension 32 are of an electrically conducting material, and would be at ground electrical potential. The base member 28 would be secured to the outer enclosure 40 of the gas-insulated electrical equipment, such as a gas-insulated transmission line or a gas-insulated capacitor bank, to which the bushing 10 is connected.

A lower corona ring 64, if desired, may be connected to the longitudinal extension 32, and thereby to ground potential, by the support wires 66.

The upper hardware of the bushing 10 is comprised of an upper metallic cap or plate 50 which is secured to the cap ring 46 and to the upper end of the bushing conductor 14. A cement 47 is disposed between the cap ring 46 and the insulating shell 12, and secures the cap ring 46 to the terminal end 48 of the insulating shell 12. The upper cap 50 has secured thereto a terminal connector 54 for receiving the ends of overhead lines which may be connected to the bushing 10. Suitable corona rings 56, 58 are connected to the metallic cap 50 and thereby to the upper end of the bushing conductor 14 by the connection wires 60, 62. The corona rings 56, 58 would thus be at the same electrical potential as the inner conductor 14.

Figure 3:
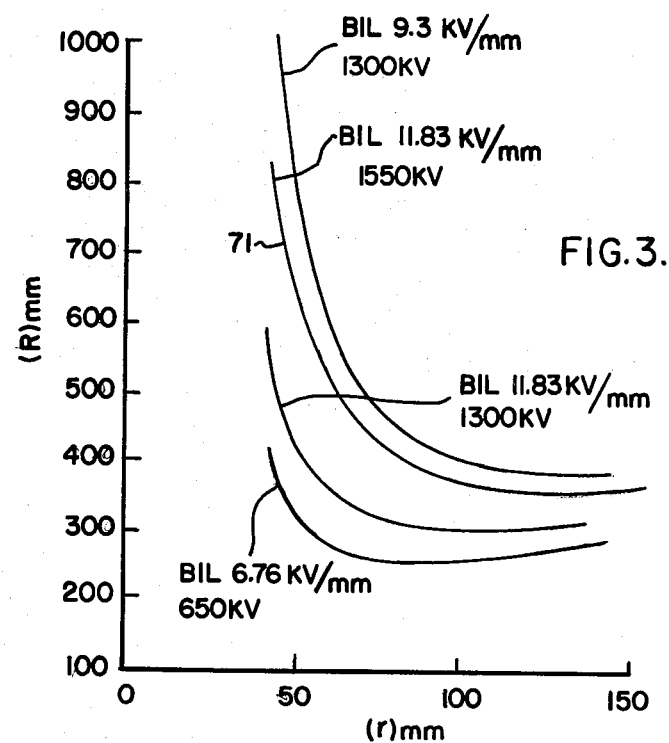

The bushing thus far described is a typical gas-to-air termination. A bushing so constructed would require a large throat diameter 70 which would result in a correspondingly more expensive shell 12. Referring now to FIG. 3, thereon is graphically shown the relationship between the conductor 14 radius and the throat end 24 radius for various voltage classes and design fields. For example, referring in particular to curve 71 which is a plot for a 1550 kV BIL bushing (ac or dc voltage) for a conductor design field of 11.83 kV/mm (80% of the theoretical strength of $SF_6$ at 10 psig), it can be seen that for a conductor 14 radius of 44.5 millimeters, the throat end 24 radius is required to be 825 mm. If the conductor 14 is increased in size to a 120 mm radius, the throat end 24 radius can be decreased to 350 mm for the same design field. Thus, a considerable cost reduction can be achieved in the porcelain or epoxy shell 12, but only with a penalty in increased conductor 14 size. A similar relationship can be found for the other BIL and design fields shown.

However, the conductor 14 only needs to have a large radius through the throat region 24 in order to obtain the optimum conditions; this is achieved in the bushing 10 of this invention by the use of an increased diameter section 74 which is located along the longitudinal length of the conductor 14 in the vicinity of the shell throat end 24. The diameter 75 of the conductor 14 at the increased section 74 is larger than the diameter 77 of the inner conductor 14 along the remainder of its longitudinal length. By so providing an increased diameter section 74 of the inner conductor 14, the required diameter 70 of the throat end 24 can be decreased in accordance with the curves of FIG. 3. By so varying the size of the diameter 75 of the conductor enlarged section 74, the ratio of conductor diameter 75 to throat diameter 70 can be made to approach its optimum ratio of $1/e$.

As shown, the enlarged section 74 of the inner conductor 14 is disposed opposite the shell throat end 24 and the grounded mounting ring 28. If desired, a cylindrical throat shield 78 can be secured to the mounting ring 28, which throat shield 78 extends longitudinally into the shell 12. The throat shield 78 is spaced apart from the enlarged section 74 of the conductor 14. With the throat shield 78 in place, the enlarged section 74 of the inner conductor 14 is disposed opposite the throat shield 78, and the enlarged section 74 extends longitudinally at least to the longitudinal ends 80, 81 of the throat shield 78.

Figure 2:
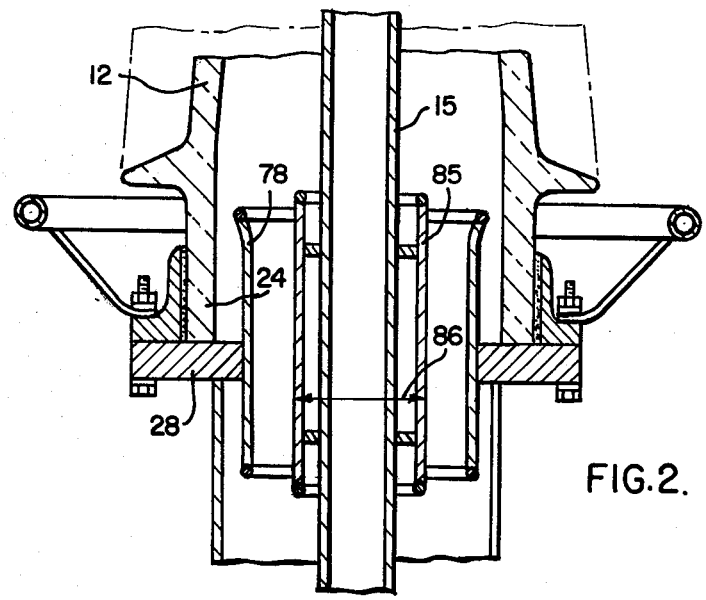
FIG. 2 is a cross-sectional view illustrating a modification to the bushing of FIG. 1; and, FIG. 3 is a graph illustrating the relationship between conductor size and bushing throat size.

Referring now more particularly to FIG. 2, therein is illustrated a modification of the bushing 10 shown in FIG. 1. In this modification, the insulating shell 12 with its throat end 24, the mounting ring 28 and the throat shield 78 are similar to that of FIG. 1. In this modification, though, the inner conductor 15 has the same diameter throughout its length. However, a tubular conductor shield 85, of an electrically conducting material, is connected to the conductor 15 and extends radially outwardly therefrom.

The conductor shield 85 is disposed longitudinally opposite the shell throat end 24, similar to the extended portion 74 of FIG. 1. The provision of this conductor shield 85 functions to increase the effective diameter 86 of the inner conductor 15, thus decreasing the throat end diameter 70 required. The use of the conductor shield 85, however, does eliminate the need to fabricate a special inner conductor 15, while still performing the function performed by the increased diameter section 74.

Therefore, it can be seen that the bushing of this invention has minimized the diameter of the shell throat required for a given conductor size, thereby providing a more economical bushing.

I claim as my invention:

1. A low-pressure gas-insulated bushing comprising:
an elongated, hollow insulating shell having a terminal end and a throat end with an opening therethrough;
electrical terminal means secured to said shell terminal end;
a tubular electric conductor disposed in said shell and extending outwardly therefrom through said throat end opening, said conductor electrically contacting said terminal means, said conductor having a first diameter section along its longitudinal length in the vicinity of a said shell throat end and a second diameter section having a second diameter less than said first diameter along the remainder of its longitudinal length; and
an insulating gas at low pressure disposed within said shell and electrically insulating said conductor from said shell.

2. The bushing according to claim 1 including an electrically grounded mounting ring secured to said shell throat end, said mounting ring being disposed opposite said conductor first diameter section.

3. The bushing according to claim 2 including a cylindrical throat shield secured to said mounting ring and extending longitudinally into said shell, and throat shield being spaced apart from said conductor, said conductor first diameter section being disposed opposite said throat shield and extending longitudinally at least to said throat shield longitudinal ends.

4. A low-pressure gas-insulated bushing comprising:
an elongated, hollow insulating shell having a terminal end and a throat end with an opening therethrough;
electric terminal means secured to said shell terminal end;
a tubular electric conductor disposed in, and spaced apart from said shell and extending outwardly therefrom through said throat end opening, said conductor electrically contacting said terminal means;
a tubular conductor shield electrically connected to said conductor and disposed longitudinally opposite said shell throat end, said conductor shield extending through said throat end opening and extending radially outwardly from said conductor; and
an insulating gas at low pressure disposed within said shell and electrically insulating said conductor from said shell.

5. The bushing according to claim 4 including an electrically grounded mounting ring secured to said shell throat end and opposite said conductor shield.

6. The bushing according to claim 5 including a cylindrical throat shield secured to said mounting ring and extending longitudinally into said shell, said throat shield being spaced-apart from said conductor shield, said conductor shield being disposed opposite said throat shield and extending longitudinally at least to said throat shield longitudinal ends.

7. The bushing according to claim 1 or 4 wherein said insulating gas is sulfur hexafluoride at a pressure of about 10 pounds per square inch gauge.

* * * * *